(12) United States Patent
Li et al.

(10) Patent No.: US 11,785,952 B2
(45) Date of Patent: Oct. 17, 2023

(54) MECHANICAL STRUCTURE, METHOD FOR INSTALLING COVER PLATES OF PASTA MACHINE, AND PASTA MACHINE

(71) Applicant: SHANGHAI TERIN CO., LTD., Shanghai (CN)

(72) Inventors: Liang Li, Shanghai (CN); Rui-Ling Zhang, Shanghai (CN)

( * ) Notice: Subject to any disclaimer, the term of this patent is extended or adjusted under 35 U.S.C. 154(b) by 0 days.

(21) Appl. No.: 17/537,902

(22) Filed: Nov. 30, 2021

(65) Prior Publication Data

US 2022/0322684 A1   Oct. 13, 2022

(30) Foreign Application Priority Data

Apr. 13, 2021   (CN) .......................... 202110393821.6

(51) Int. Cl.
*A21C 11/16*   (2006.01)
*A21C 11/22*   (2006.01)

(52) U.S. Cl.
CPC .............. *A21C 11/16* (2013.01); *A21C 11/22* (2013.01)

(58) Field of Classification Search
CPC ................................ A21C 11/16; A21C 11/22
See application file for complete search history.

(56) References Cited

U.S. PATENT DOCUMENTS

| | | | |
|---|---|---|---|
| 812,704 A | 2/1906 | De Vito | |
| 3,716,893 A * | 2/1973 | Vogelsang | A22C 9/008 452/142 |
| 4,085,482 A * | 4/1978 | Charron | A22C 9/004 452/144 |
| 4,531,259 A * | 7/1985 | Bridge, Jr. | A22C 9/008 452/142 |
| 4,653,151 A * | 3/1987 | Berdou | A22C 25/17 99/589 |
| 4,798,283 A * | 1/1989 | Booth | A21C 9/04 198/860.5 |
| 4,947,741 A * | 8/1990 | Gongwer | A47J 37/044 99/402 |
| 5,277,569 A * | 1/1994 | Anetsberger | A21C 7/04 425/332 |
| 5,628,237 A * | 5/1997 | Lindee | B26D 7/01 83/403.1 |
| 6,016,935 A * | 1/2000 | Huegerich | B67D 1/10 222/146.1 |
| 8,752,480 B1 * | 6/2014 | DeJong | A23L 2/04 99/506 |
| 11,406,108 B1 * | 8/2022 | Alatorre | A21C 11/10 |
| 11,470,989 B2 * | 10/2022 | Kurmlavage | A47J 37/048 |

(Continued)

FOREIGN PATENT DOCUMENTS

| | | | |
|---|---|---|---|
| CN | 2087874 U | * | 11/1991 |
| CN | 2631230 Y | * | 8/2004 |

(Continued)

*Primary Examiner* — Emmanuel S Luk
(74) *Attorney, Agent, or Firm* — Sandy Lipkin (57) ABSTRACT

A mechanical structure for installing cover plates of a pasta machine includes at least two brackets arranged symmetrically; a plurality of cover plates arranged between the two brackets, two ends of each cover plate are respectively and detachably connected to the two brackets. The cover plates are integrally formed by sheet metal technology. The cover plates are connected/mounted to brackets respectively through a snap-on and/or a slide-on connection.

10 Claims, 8 Drawing Sheets

(56) References Cited

U.S. PATENT DOCUMENTS

2005/0082144 A1* 4/2005 Maupin ................ A23N 12/023
99/628
2017/0233191 A1* 8/2017 Yoshimoto ............. B65G 21/02
198/793
2019/0362585 A1* 11/2019 Diaz .................... G09G 3/3208

FOREIGN PATENT DOCUMENTS

| CN | 207653443 U | * | 7/2018 | |
|----|----|----|----|----|
| CN | 212650325 U | * | 3/2021 | |
| WO | WO-2009016465 A2 | * | 2/2009 | ............. A21C 11/24 |

* cited by examiner

( prior art )

MECHANICAL STRUCTURE, METHOD FOR INSTALLING COVER PLATES OF PASTA MACHINE, AND PASTA MACHINE

BACKGROUND OF THE INVENTION

1. Fields of the Invention

The present invention relates to a mechanical structure (also known as mounting structure) for installing cover plates of a pasta making machine, a method for installing the brackets and the cover plates of the pasta machine, and a pasta machine.

It should be noted, that the pasta machine here in the present application broadly refers to pasta machines, pasta making machines, pasta makers and noodle making machines, noodle makers or pasta slices making machines and pasta strips making machines and so on, because in China pasta broadly refers to various pasta types, for example, pasta slices, pasta strips, noodles and so on.

2. Descriptions of Related Art

The pasta machine is a machine that adopts the principle of parallel rolling, i.e. feeding dough between two dough rollers or two dough knives rolling parallel to each other. After the dough passes through the dough rollers or dough knives, the dough is rolled into a slice/thin sheet by the dough rollers or cut into pastas strips like noodles by the pasta knives with key grooves. The hand cranked pasta machine was first invented by Angelo De Vito in 1905 in the United States of America, and then U.S. Pat. No. 812,704 was granted to him. Afterwards, the pasta machine was improved by an Italian manufacturer, so as to mass manufacture pasta machine for households and kitchens and help people making pasta by machine instead of by hand.

Figure 10A:
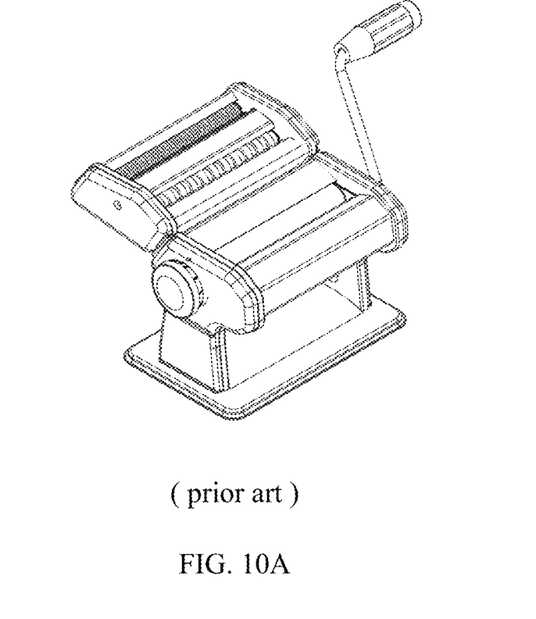
FIG. 10A is a perspective view of the pasta machine in the prior art.
Figure 10B:
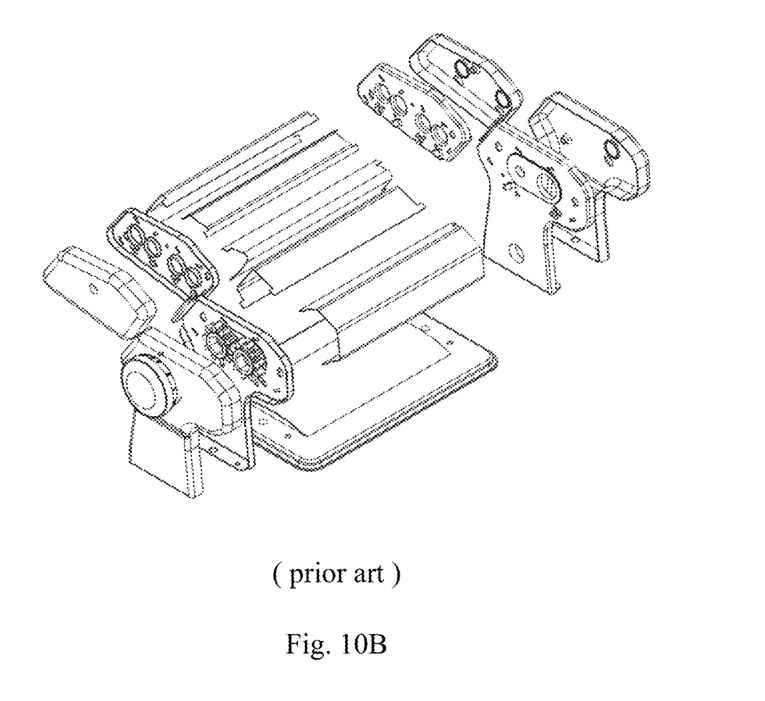
FIG. 10B is an exploded view of the pasta machine in the prior art.

Pasta machines in the art usually comprises two parts, i.e. the pasta dough rolling part and the cutting part, which are also known as pasta dough roller and pasta dough cutter. As the development of the pasta machine, in order to improve the aesthetics of the pasta machine and protect the internal structure of the machine, the pasta machine in the art, as illustrated in FIG. 10A and FIG. 10B, usually comprises mainly front cover plates, side cover plates, side brackets, bottom plate, dough rollers or knives, built-in supports and other structures, moreover, at least four to eight pins are arranged/formed on the two end of the each cover plates, and a plurality of assembling holes (slots) are provided on the opposite of the side brackets.

During the installation of the cover plates of the pasta machine in the art, the four or eight pins of each cover plate shall be squeezed to the assembling holes reserved on the brackets of the pasta machine. It is rather difficult, however, to squeeze all the pins of the cover plates to the assembling holes in a short time, a skilled assembly personnel spends a minimum of twenty minutes to finish the assembly of the pasta machine with such cover plates. Therefore, the method for assembling the cover plates of the pasta machine in the prior art is unpractical, since it is easy to cause accidents such as improper installation, scratching to the pasta machine, scratching to the assembly personnel, etc. Moreover, the installation process is also time-consuming and labor-intensive, and it causes a greater deformation of the cover plate under the force of resistance in operation of the pasta making machine, even causes the damage of the built-in structure of the pasta making machine.

SUMMARY OF THE INVENTION

An object of the present invention is to provide a mechanical structure (also known as mounting structure) for installing cover plates of the pasta machine.

In order to achieve the above object and solve the drawbacks mentioned in prior art, the present invention is implemented in the way as described in below: a mechanical structure for installing cover plates of the pasta machine, wherein that the mechanical structure includes: brackets, at least two brackets are provided, and are arranged symmetrically on both sides of the pasta machine respectively; cover plates, a plurality of cover plates is provided, and are all arranged between the two brackets, both ends of each cover plate are connected to the brackets; The cover plates are integrally formed. The cover plates are detachably connected to the two brackets.

Another object of the present invention is to provide a method for applying and installing the structured cover plates of the pasta machine, which adopts the above-mentioned mechanical structure. The method for applying and installing the cover plates of the pasta machine includes arranging the brackets symmetrically on both sides of the pasta machine respectively, shaping the cover plates into a corresponding form through sheet metal technology, and installing the cover plates between the two brackets through the plurality of blocks on the side of brackets.

A further object of the present invention is to provide a pasta machine. The pasta machine comprises a main body of pasta machine and the above-mentioned mechanical structure, wherein that each of the brackets are detachably and respectively connected to the both sides of the main body of pasta machine.

Comparing with the prior art, the technical solutions provided by the present invention have the following advantages. The present invention provides a mechanical structure which includes two brackets symmetrically arranged on both sides of pasta machine respectively, and cover plates integrally formed by sheet metal technology. The cover plates are snapped and/or a slid on the brackets. The mechanical structure provided by the present invention is well-structured to realize safe and easy installation of cover plates on pasta machine, also it can work as stiffening structure helping to mitigate negative force of the unstable position on pasta machine caused by parallelogram structure. The connection between cover plates and the brackets reduces the occurrence of accidents such as improper installation, scratching on the pasta machine, and scratching on the assembly personnel due to the greater difficulties of installation. The mechanical structure with the brackets and cover plates, the installation method provided by the present application overcomes the disadvantages of time-consuming, labor-intensive and hazardous handling occurring in prior art. Moreover, the mechanical structure with cover plates and brackets is also proved to be effective in reducing negative force generate from unstable positions of parallelogram structured pasta machine.

Wherein: 1—bracket(s); 2—cover plate(s); 3—base; 4—adjustment member; 5—driving roller(s); 6—housing; 7—driving source; 8—the first positioning block; 9—the second positioning block; 10—the third positioning block; 11—locking member(s); 12—discharge outlet.

DETAILED DESCRIPTION OF THE PREFERRED EMBODIMENT

In order to clarify the objects, technical solutions, and the advantages of the present invention clearly, the description of the present invention in detail with reference to the accompanying drawings and preferred embodiments are provided here in below. It should be understood that the embodiments described here are only used to explain the present invention, but not to limit the scope of the present invention.

In order to clarify the technical problems to be solved by the present invention, the technical solutions and beneficial effects of the present application clearly, the following content further describes the present invention in detail with reference to the accompanying drawings and preferred embodiments. With the preferred embodiments the present invention can be further understand by those skilled in the art, but the preferred embodiments are not used to limit the present invention in any form. It should be pointed out that for those skilled in the art, several modifications and improvements can be made without departing from the concept of the present invention. These all belong to the protection scope of the present invention. In order to clarify the technical solution of the present invention in a simple way, some well-known structures and some well-known processing steps of installation in the art are omitted here. It should be understood that the same reference number always represent the same member. Furthermore, various members and regions in the drawings are only schematically illustrated and they are not used to limit the relative sizes or intervals of the various parts of present application.

The implementation of the present invention will be described in detail with reference to the preferred embodiments below.

Figure 7:
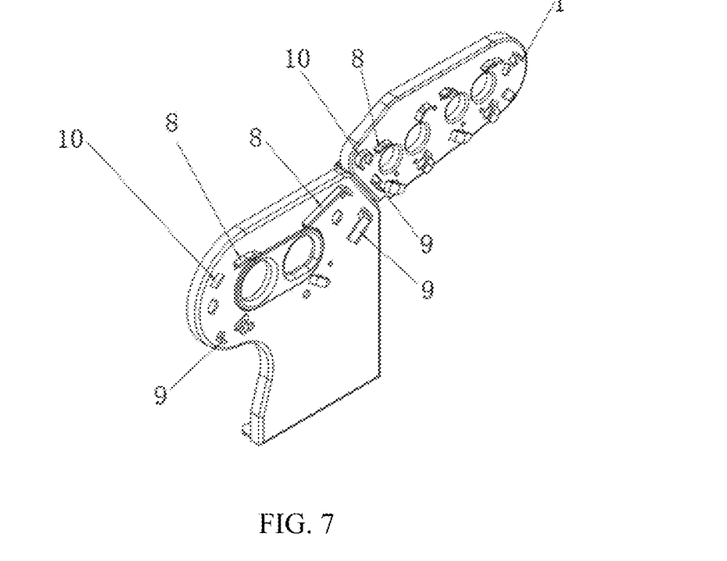
FIG. 7 shows the perspective view of the overall bracket composed of the lower half of the bracket in FIG. 2 and the upper half of the bracket in FIG. 4.

FIGS. 1-4 show the brackets of the mechanical structure (also known as mounting structure) provided by an embodiment of the present invention and how the cover plates connect to the brackets. FIG. 7 shows the perspective view of the overall bracket composed of the lower half of the bracket in FIG. 2 and the upper half of the bracket in FIG. 4.

As FIGS. 1-4 and FIG. 7 illustrate, a mechanical structure for applying and installing cover plates of a pasta machine includes brackets 1 and cover plates 2. At least two brackets are provided and are arranged symmetrically on both sides of the pasta machine respectively. A plurality of cover plates is provided and arranged between two brackets 1 for covering and protecting the main body of the pasta machine; both ends of each cover plate 2 are connected with the brackets 1. The cover plates 2 are integrally formed through sheet metal technology. The cover plates 2 are detachably connected to the two brackets.

In the embodiment of the present invention, the two brackets 1 are symmetrically arranged on both sides of the main body of the pasta machine. The cover plates 2 are integrally formed through sheet metal technology, and then the cover plates 2 are assembled between the symmetrically arranged brackets 1 through snapping-on or/and sliding-on. The present invention has a direct viewing structure and can be easily assembled. It can also reduce the installation failures and avoid hazardous handling caused by the prior art, for example, improper installation, cover plates and its pins deform, scratching to the brackets and occupational and operational risks of wounding hands. The entire installation process saves time and effort. Moreover, the installation structure can also support the main body of the pasta machine after installation, so that the main body of the machine will be highly supportive to cope with the deformation caused by force of resistance from operation of rolling pasta machine.

Figure 2:
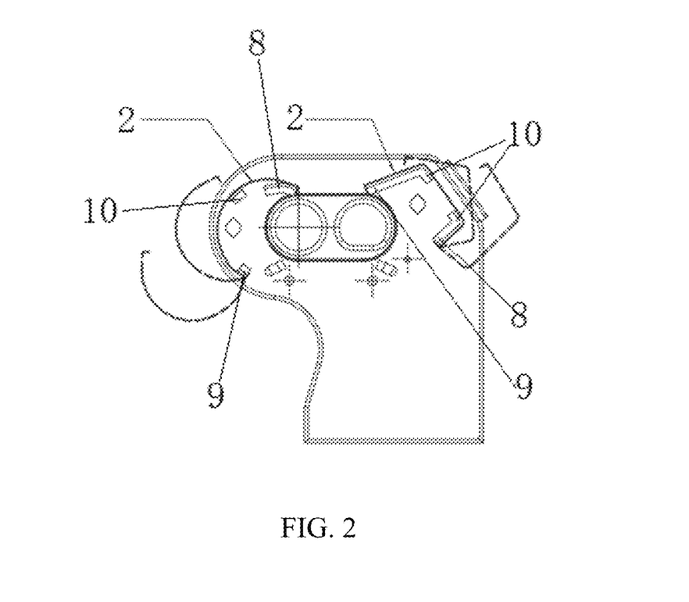
FIG. 2 is a schematic side view of the lower half of the bracket shown in FIG. 1.
Figure 4:
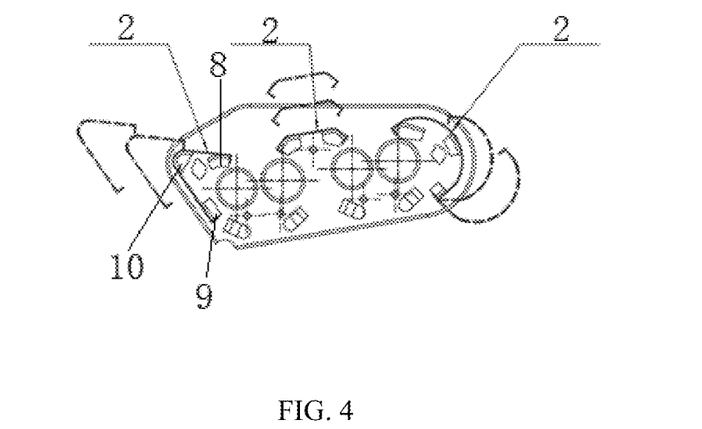
FIG. 4 is a schematic side view of the upper half of the bracket shown in FIG. 3.

As shown in the preferred embodiment of the present invention in FIGS. 2, 4, and 7, plurality of positioning blocks is symmetrically provided on the opposite side of the symmetrically arranged brackets 1. The positioning blocks include a first positioning block 8 and a second positioning block 9 for fixing the cover plates between the brackets;

The first positioning block 8 and the second positioning block 9 are respectively connected to the cover plates through two locking members 11 formed on the cover plates, the first positioning block 8 and the second positioning block 9 are preferably processed on the bracket 1 by a stamping process. The first positioning block 8 and the second positioning block 9 can be implemented in various shapes accordingly, however, they are preferably rectangular in this embodiment. When the cover plates 1 are connected to the first positioning block 8 and the second positioning block 9, the sides of the first positioning block 8 and the second positioning block 9 are respectively buckled together with the locking members 11 formed on the cover plate 2 for forming a supporting force, so that the cover plate 2 is fixed to the bracket 1 and will not easily fall depart from bracket 1.

As shown in FIGS. 2, 4, and 7, as another preferred embodiment of the present invention, the positioning blocks can further include a third positioning block 10 for properly positioning the cover plate on the brackets. The positioning block 10 is provided on the brackets in between the first positioning block 8 and the second positioning block 8 (See FIGS. 2 and 4).

Preferably, when the cover plates 2 are connected to the first position block 8 and the second position block 9, the positioning block 10 is used to position the cover plate 2 with a special shape, so as to make the cover plate 2 strongly connect to the first positioning block 8 and the second positioning block 9.

The positioning block 10 in above mentioned embodiment is preferably formed on the brackets 1 through a stamping process. When the region of the pasta machine covered by the cover plate 2 has a special shape, the cover plate 2 shall be formed into a special shape conforming to the shape of the pasta machine accordingly, and then the special-shaped part of the cover plates 2 is positioned by the positioning block 10, so that the cover plates 2 will not be easily deformed under pressure, and will be connected to the first positioning block 8 and the second positioning block 9 strongly.

Figure 5:
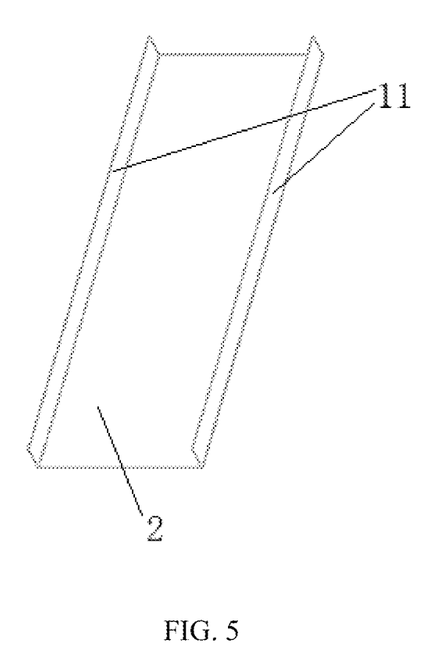
FIG. 5 is a perspective view of an embodiment of the locking members.
Figure 6A:
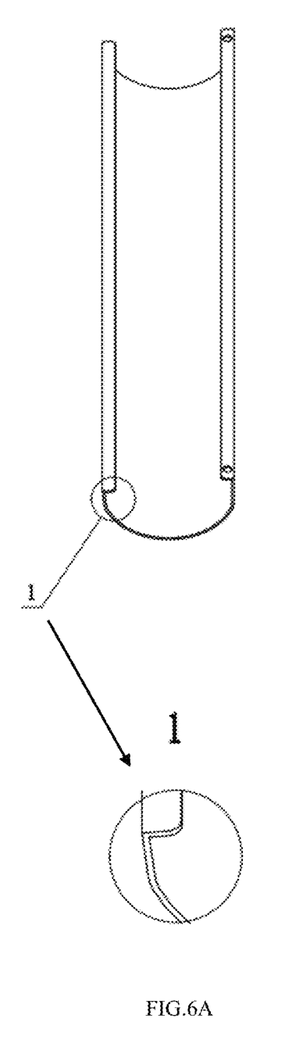
FIGS. 6A-6E show embodiments of each cover plate with locking members respectively shown in the embodiments of FIGS. 1-4.
Figure 6B:
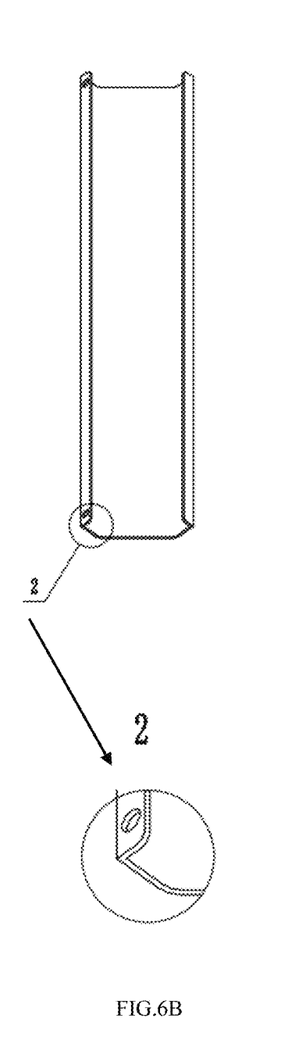
Figure 6C:
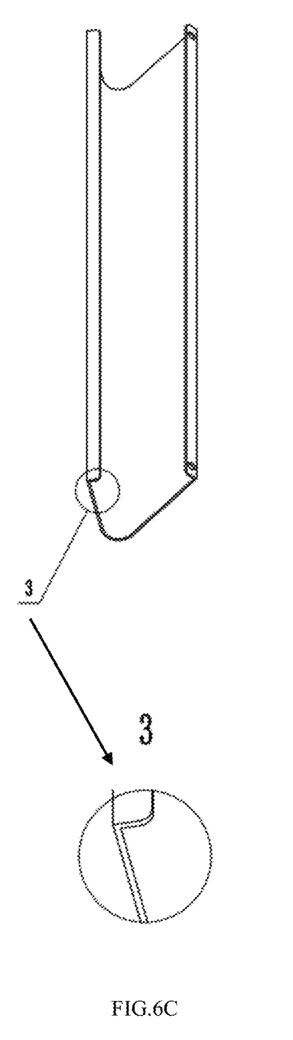
Figure 6D:
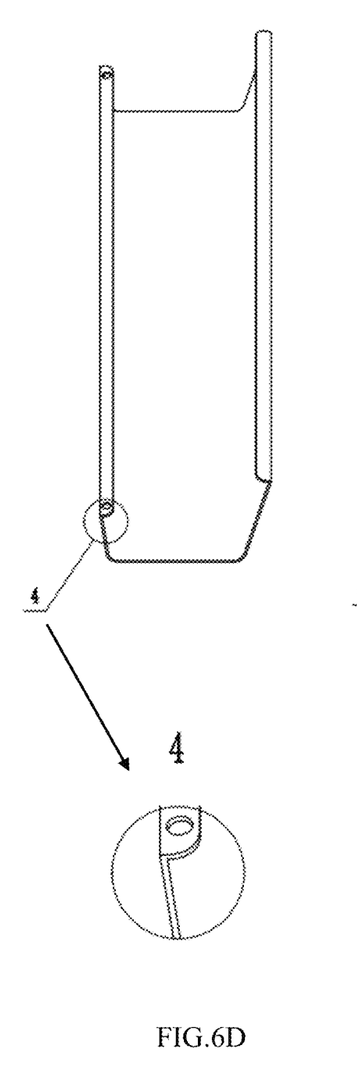
Figure 6E:
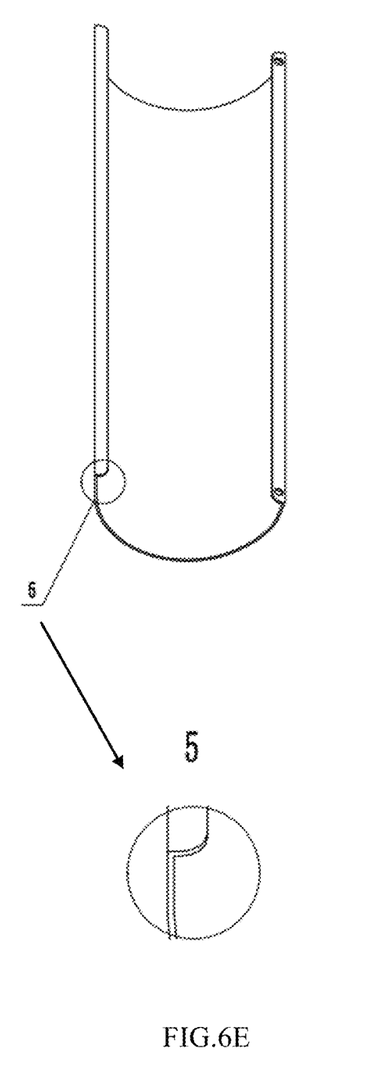

FIG. 5 is a perspective view of an embodiment of the locking members of the present invention. As illustrated in FIG. 5, a cover plate 2 includes a main body of the cover plate and two locking members 11 respectively formed on both long-sides of the cover plate by a sheet metal process. The locking members 11 are not only formed for connecting the bracket 1, but also for avoiding a scratching or a cutting caused by the sharp edge of the cover plate to the assembly personnel during the installation of the mechanical structure. Furthermore, the locking members 11 can also act as stiffening ribs of the cover plates 2, so that the cover plates 2 are not easily deformed during the installation and using.

The locking members 11 are formed as bended-edges on both long-sides of the cover plate 2 respectively by a bending sheet metal process. The shape of the locking members 11 in the embodiment is preferably formed as an "L" shape through bending the edges of the pre-cut metal plate. The right-angled sides (the bended-edge) of the locking members 11 match the first positioning block 8 and the second positioning block 9. With the assistance of external force, the locking members 11 are assembled to the first positioning block 8 and the second positioning block 9 through a snapping-on and/or sliding-on.

FIGS. 6A-6E show the embodiments of the cover plates with the locking members of the present invention. As illustrated in FIGS. 6A-6E, the main body of the cover plate located between the two sets of locking members 11, and after the bending sheet metal process of the locking members, the main body is formed by a further sheet metal process according to the outer contour shape of the main body of pasta machine.

As illustrated in FIGS. 6A-6E, the main body of the cover plate can be shaped into a form with cross-section in a triangle, an arc, etc. It is determined according to the outer contour shape of the pasta machine covered by the cover plate 2. The cover plate 2 formed by the sheet metal process is connected to the bracket 1, and then the special-shaped region of the cover plate 2 is supported and positioned by the third positioning block 10, so that the cover plate 2 are firmly connected to the bracket 1.

Figure 8:
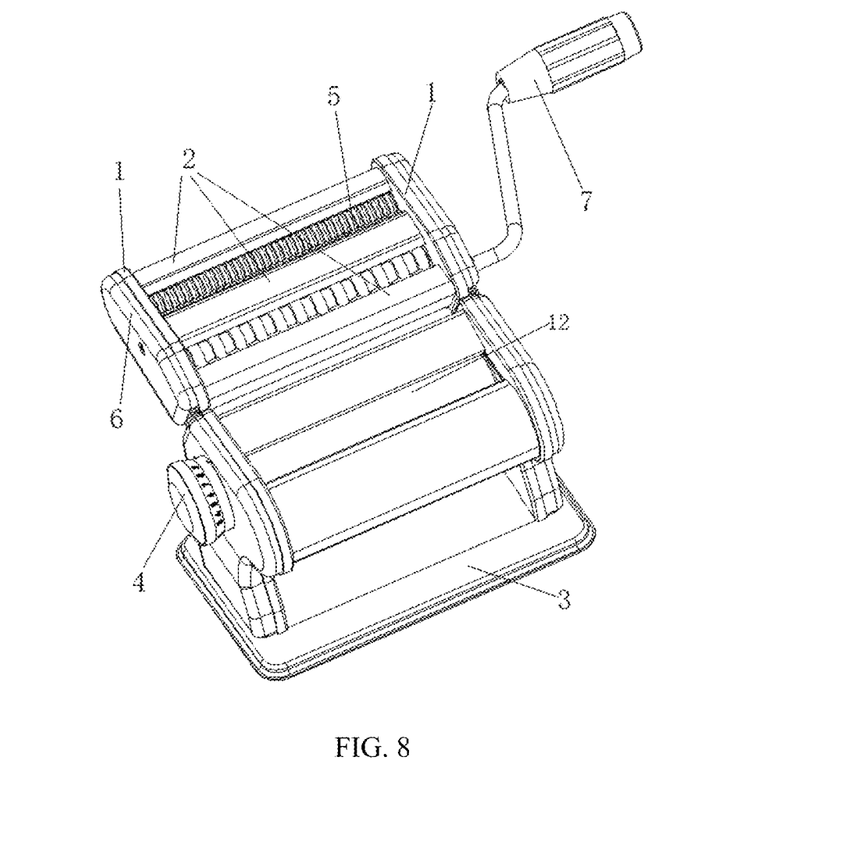
FIG. 8 is a perspective view of the pasta machine provided by an embodiment of the present invention.
Figure 9:
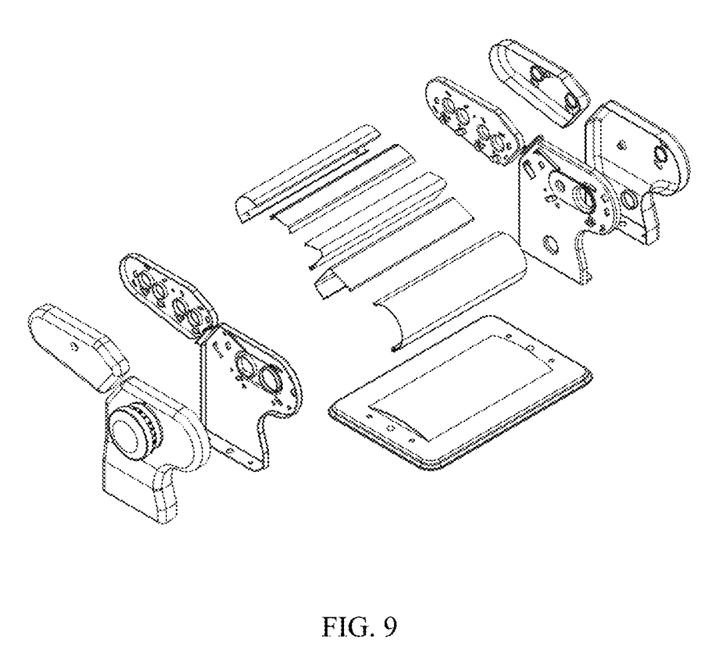
FIG. 9 shows an exploded view of the present application before the cover plates are assembled to the brackets.

FIG. 8 is a perspective view of the pasta machine provided by an embodiment of the present invention. As shown in FIG. 8, the distance between the symmetrically arranged brackets 1 is preferably equal to the length of the cover plates 2, so that besides covering the main body of the pasta machine, the cover plates 2 can further provide a supporting force on the two brackets 1. Therefore, the brackets 1, the cover plates 2 and the main body of the pasta machine will not be easily deformed by the resistance force generated by the main body of the pasta machine during operation.

As shown in FIGS. 1-7, the present invention also provides a method for applying and assembling cover plates of a pasta machine. The method for assembling cover plates to a pasta machine includes using the above-mentioned mechanical structure, and connecting the brackets 1 to the both sides of the pasta machine respectively; shaping the cover plates 2 according to the outer contour of the main body of the pasta machine through sheet metal technology; and connecting both ends of the cover plates 2 on the brackets 1 respectively through the said blocks.

In the preferable implementation of the present invention, the steps of the method for assembling the cover plates and main body of the pasta machine further include:

Step 1: Bending both long-sides of a pre-cut metal plate into a form with two bended edges at two opposite long-sides through sheet metal technology to form the locking members 11, wherein, the pre-cut metal plate is used for forming the cover plates 2;

Step 2: Shaping the edges-blended mental plate into the cover plate according to the outer contour of the main body of the pasta machine;

Step 3: Stamping the positioning blocks on the side surface of the brackets 1 according to the outer contour of the pasta machine main body and the shape of the cover plates 2, so as that the angle and the position of the blocks matches the cover plates 2; and Step 4: Connecting the cover plates 2 to the brackets 1.

Further, the above-mentioned method of connecting the cover plates 2 to the brackets 1 includes: firstly connecting one long-side of the cover plate 2 to one set of positioning blocks of both two brackets 1 through the locking members 11 thereon, and then rotating the cover plate till the other long-side of the cover plate 2 is snapped on the other set of positioning blocks of both brackets 1 through the locking members 11 on the other long-side.

Figure 1:
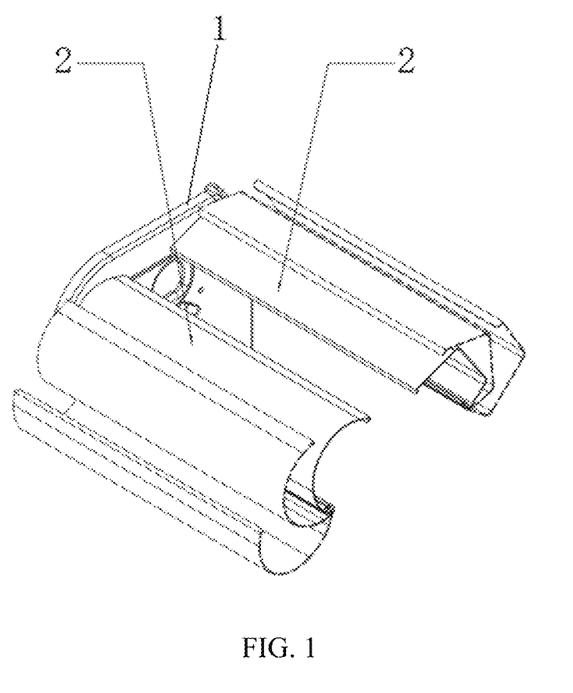
FIG. 1 is a perspective view of an embodiment of the lower half of the bracket of the mechanical structure provided by the present invention (with cover plates)

Preferably, as showed in FIGS. 1 and 2, the two brackets 1 are connected to both sides of the pasta machine and the locking member 11 of one long-side of the cover plate 2 on one set of blocks formed on the two brackets 1, for example, the set of first positioning blocks 9 is snapped. Then the whole cover plate is rotated until the locking member 11 of the other side of the cover plate 2 snaps on the other set of blocks formed on the two brackets, for example the set of second positioning blocks 10, so that the cover plate 2 is connected to blocks through snapping-on. The installation process is then completed.

Further, the above-mentioned method of connecting the cover plates 2 to the brackets 1 includes firstly connecting both locking members 11 of the cover plate 2 to the brackets 1 arranged on both sides of the pasta machine and then pushing the cover plate 2 directly till all the position blocks slide under the locking member 11.

Figure 3:
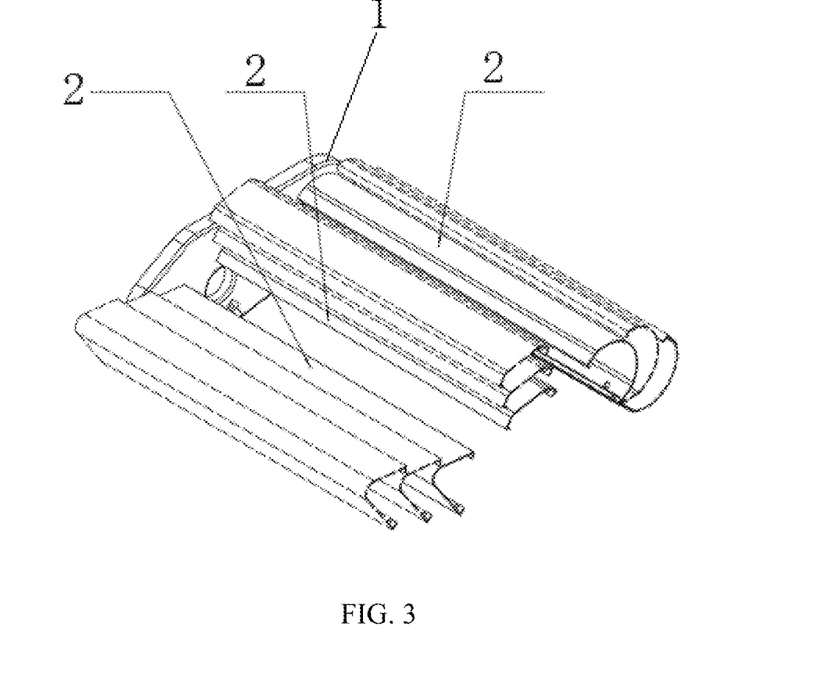
FIG. 3 is a perspective view of an embodiment of the upper half of the bracket of the mechanical structure provided by the present invention (with cover plates)

Preferably, as illustrated in FIGS. 3 and 4, both locking members 11 of the cover plates 2 are connected to all corresponding positioning blocks of both two brackets 1 through the locking member 11 thereon and then the cover plates are pushed until both locking members 11 of the long-side of the cover plates 2 are slide under all positioning blocks of brackets 1, so that the cover plate 2 is well-connected to blocks. The installation process is then completed.

FIG. 8 is a perspective view of the pasta machine provided by an embodiment of the present invention. As shown in FIG. 8, the pasta machine includes a main body of pasta machine and the above-mentioned mechanical structure. Both sides of the main body of the pasta machine are detachably connected with brackets 1.

Preferably, the main body of the pasta machine further includes a base 3 arranged on one side of the cover plates 2 and used for supporting the pasta machine. A plurality of driving rollers 5 is arranged between the base 3 and the cover plate 2, and rotate synchronously. The two brackets 1 are symmetrically arranged at the two ends of the driving roller 5 respectively, and protected by housings 6 respectively. One end of the driving roller 5 is connected to a driving source 7, and further connected to the power output end of the driving source 7. A discharge outlet 12 is also provided between the driving roller 5 and the base 3. An adjustment member 4 is provided at one end of the discharge outlet 12 for adjusting the thickness of the pasta products.

The driving member 7 provides power to drive the driving roller 5 to rotate, so that the plurality of driving rollers 5 squeeze and cut the dough, and then output the pasta products through the discharge outlet 12. During the manufacturing of the pasta products, the size (for example, the thickness and the length) of the outputted pasta products can be adjusted through the adjustment member 4.

The driving member 7 can be a crank, a motor, etc., however, a hand crank is preferably used here. The driving member 7 provides power to drive the driving roller 5 to rotate.

The plurality of driving rollers 5 is provided and connected to each other by gears and/or conveyor belts, so as to work together properly to process the dough into dough plate, and then the dough plate is further processed to pasta products, for example pasta strips or pasta slices. The process of making pasta products is completed.

The adjustment member 4 is provided to adjust the distance between the driving rollers 5, and further adjust the size (the thickness and the length) of the outputted pasta products from the discharge outlet 12.

The above-described embodiments of the present invention provide a mechanical structure and based on the mechanical structure, a method for assembling cover plates to the main body of a pasta machine and a pasta machine are provided. Wherein two brackets 1 are symmetrically arranged on both sides of pasta machine respectively, and the cover plates 2 are integrally formed by sheet metal technology. The cover plates are then assembled and connected to the brackets 1 through the position blocks and the assembling method of snapping-on and/or sliding-on. The mechanical structure provided by the present invention is well-structured to realize safe and easy installation of cover plates on pasta machine. The connection between cover plates and the brackets reduces the occurrence of failures and accidents such as improper installation, scratching of the pasta machine, and scratching of the construction personnel due to the greater difficulties of installation. The locking member in L shape (bended edge) on both long-sides of the cover plates resolve hazardous handling problems of prior art, which help to avoid wounding assembly personnel during installation process and eliminate contacting injuries to final users when using pasta machine. The mechanical structure provided by the present application overcomes the disadvantages of time-consuming and labor-intensive occurring in prior art. Moreover, the mechanical structure can also support the main body of the pasta making machine after installation, so that the main body of the pasta making machine and the built-in structure are not easily deformed under the force of resistance.

In the above-described preferred embodiments of the present invention, it should be noted that the terms "installation", "assembly" "connect with/to" and "connection" should be interpreted broadly unless otherwise specified and limited. For example, the connection can be a fixed connection, a detachable connection, or an integral connection. It can also be a mechanical connection or an electrical connection; it can also be a directly connection or an indirect connection through an intermediate medium; and it can be the internal communication between two components. For those skilled in the art, the specific meaning of the above-mentioned terms in the present invention can be understood through specific circumstances.

The preferred embodiments of the present invention have been described in detail above. However, the present invention is not limited to the above-mentioned embodiments. Those skilled in the art can also make various modifications and improvements to the present invention without any effort without departing from the purpose of the present invention in the scope of their knowledge. It is unnecessary and impossible to list all the implementation methods here. The obvious improvements or modifications derived from the present application and the above-mentioned embodiments are still within the protection scope of the present invention.

The invention claimed is:

1. A pasta machine, wherein that the pasta machine comprises a main body of pasta machine and a mechanical structure, comprising:
    at least two brackets configured to be arranged symmetrically on both sides of a pasta machine respectively, a plurality of blocks being provided on the opposite sides of the at least two brackets; and
    a plurality of cover plates arranged between the at least two brackets; both ends of each of the plurality of cover plates are connected to the brackets,
    wherein the cover plates are integrally formed, and detachably connected to the at least two brackets, and
    wherein two locking members formed integrally on sides of each of the plurality of cover plates respectively through sheet metal technology, and the two locking members are used for connecting to the at least two brackets through a plurality of blocks.

2. The pasta machine as claimed in claim 1, the plurality of blocks comprising a first positioning block and a second positioning block,
    wherein the first positioning block and the second positioning block are used for connecting to a corresponding cover plate.

3. The pasta machine as claimed in claim 2, wherein the plurality of blocks further comprise a third positioning block arranged between the first positioning block and the second positioning block, the third positioning block being used for positioning and supporting a shape of the cover plate.

4. The pasta machine as claimed in claim 1, wherein that the plurality of cover plates are shaped to an outer contour form of the pasta machine.

5. The pasta machine as claimed in claim 1, wherein that a distance between the at least two brackets is equal to a length of the plurality of cover plates.

6. A method for installing the cover plates of the pasta machine as claimed in claim 2, comprising:
    arranging the at least two brackets symmetrically on both sides of the pasta machine respectively;
    shaping a pre-cut metal plate into the plurality of cover plates with a corresponding form through sheet metal technology; and
    installing the plurality of cover plates between the at least two brackets through the plurality of blocks.

7. The method for installing the cover plates of the pasta machine as claimed in claim 6, wherein said shaping a pre-cut metal plate into the plurality of cover plates includes:

shaping a pre-cut metal plate into an edge-bended form with two bended edges respectively at two opposite sides as the two locking members; and then shaping the edge-bended mental plate into the plurality of cover plates with a corresponding form.

8. The method for installing the cover plates of the pasta machine as claimed in claim 6, wherein said installing the cover plates between the two brackets through the plurality of blocks includes:

firstly connecting one side of the plurality of cover plates to one of the plurality of blocks of the at least two brackets through the locking members thereon; and then rotating the plurality of cover plates until another side of the cover plates is connected to another of the plurality of blocks of the at least two brackets through the locking members on the other side, wherein both sides of the plurality of cover plates are edge-bended.

9. The method for installing the cover plates of the pasta machine as claimed in claim 6, wherein said installing the plurality of cover plates between the at least two brackets through the plurality of blocks includes:

firstly connecting the two locking members of the plurality of cover plates to the at least two brackets arranged on both sides of the pasta machine; and then pushing the plurality of cover plates directly until the plurality of blocks slide under the two locking members and the plurality of cover plates are well connected to brackets.

10. A method for installing the cover plates of the pasta machine as claimed in claim 3, comprising:

arranging the at least two brackets symmetrically on both sides of the pasta machine respectively;

shaping a pre-cut metal plate into the plurality of cover plates with a corresponding form through sheet metal technology; and installing the plurality of cover plates between the at least two brackets through the plurality of blocks.

* * * * *